United States Patent [19]

Shahinpoor et al.

[11] Patent Number: 5,114,300

[45] Date of Patent: May 19, 1992

[54] ROBOTIC APPARATUS

[75] Inventors: Mohsen Shahinpoor, Albuquerque; Bradford L. Smith, Santa Fe, both of N. Mex.

[73] Assignee: Wovenwire Corporation, Santa Fe, N. Mex.

[21] Appl. No.: 466,041

[22] Filed: Jan. 17, 1990

Related U.S. Application Data

[63] Continuation-in-part of Ser. No. 319,653, Mar. 2, 1989, Pat. No. 4,927,674.

[51] Int. Cl.⁵ ............................................. B25J 17/02
[52] U.S. Cl. ..................................... 414/729; 74/479; 248/654; 901/29; 403/24; 403/172
[58] Field of Search .............. 414/729, 735, 731, 680; 901/28, 21, 22, 23, 29; 248/654; 403/24, 172, 176

[56] References Cited

U.S. PATENT DOCUMENTS

| 4,666,362 | 5/1987 | Landsberger et al. | 901/21 X |
|---|---|---|---|
| 4,762,459 | 8/1988 | Morita et al. | 901/28 X |
| 4,806,068 | 2/1989 | Kohli et al. | 901/23 X |
| 4,815,911 | 3/1989 | Bengtsson et al. | 901/21 X |
| 4,848,179 | 7/1989 | Ubhayakar | 901/28 X |

OTHER PUBLICATIONS

"A Forward Displacement Analysis of a Class of Stewart Platforms", by M. Griffis and J. Duffy, *Journal of Robotic Systems*, pp. 705-720 (1989).

"Singular Configurations of Parallel Manipulators and Grassman Geormetry" by Jean-Pierre Merlet, *International Journal of Robotics Research*, vol. 8, pp. 45-56 (Oct. 1989).

*Primary Examiner*—Robert J. Spar
*Assistant Examiner*—Donald W. Underwood
*Attorney, Agent, or Firm*—Deborah A. Peacock; Donovan F. Duggan

[57] ABSTRACT

A robotic structure having a low mass, capable of providing seven degrees of freedom, and movable in a hemispherical workspace. The robotic structure includes several platforms connected by actuatable longitudinal members and movable joints made of intersecting or interwoven wire members.

23 Claims, 8 Drawing Sheets

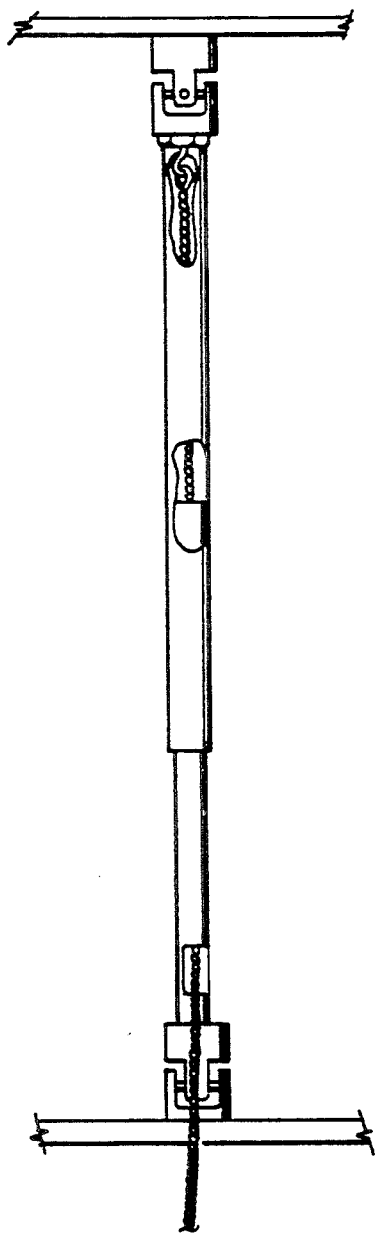
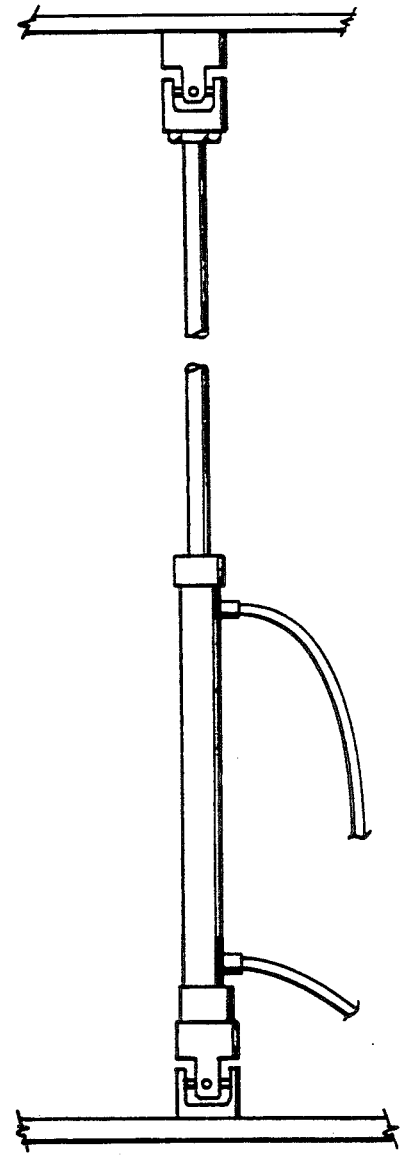
FIG—4  FIG—5

ROBOTIC APPARATUS

CROSS-REFERENCE TO RELATED APPLICATION

This application is a continuation-in-part application of U.S. patent application Ser. No. 07/319,653, entitled "Woven Wire Apparatus," to Bradford L. Smith, filed on Mar. 2, 1989 now U.S. Pat. No. 4,927,674, dated May 22, 1990, the teachings of which are incorporated herein by reference.

BACKGROUND OF THE INVENTION

1. Field of the Invention (Technical Field)

The invention relates to robotic structures and more particularly to an extremely light weight or low mass, seven-degree-of-freedom robotic arm capable of moving substantially throughout a hemispherical workspace.

2. Description of the Related Art Including Information Disclosed under 37 C.F.R. §§1.97-1.99 (Background Art)

Computer-controlled robotic arms have been extremely used throughout the world and particularly in the United States and Japan. M. Shahinpoor, *A Robot Engineering Text Book*, Harper and Row Publishers, NY, USA (1987), provides a comprehensive literature survey on various kinds of prior art robot manipulators and structural designs. Two basic problems have been associated with conventional prior art robot manipulators: (1) They are generally built to be massive and stiff so as to eliminate motion control problems associated with structural flexibility; and (2) they generally move slowly because of their massive size and rigidity. Thus, there continues to be a great need in the manufacturing industry and government laboratories, as well as in defense organizations, for light weight, stiff, and subsequently fast moving robot manipulators.

The present invention, a preferred embodiment of which is shown in FIG. 1 and described herein, solves the problems caused by the deficiencies of prior art conventional robot manipulators. Since all legs of the preferred embodiment are simply supported at both ends by three-dimensional joints such as universal or ball-and-socket joints, the stresses in them are only axially distributed and thus provide stress-compensated robotic structures. The preferred embodiment of the present invention also has a minimum amount of extra mass and is essentially an ultra-light weight manipulator. The ultra-light weight, stress-compensated robotic arm is inherently capable of rapid accelerations and fast movements. It is further capable of moving symmetrically and hemispherically about its base platform; something that current robotic structures are unable to do.

The '653 application is directed in general to structures having intersecting wires. The teachings of this application are applicable to the present invention.

SUMMARY OF THE INVENTION (DISCLOSURE OF THE INVENTION)

The invention relates to a low mass robotic structure, useful as a robotic arm. This robotic arm comprises: a base platform; an effector platform; movable joint means which supportively spaces and connects the base platform and the effector platform; linear actuators which operatively connect the base platform and the effector platform; and means for selectively actuating each of the linear actuators to operate the robotic arm.

In the preferred embodiment, having at least seven degrees of freedom, the robotic arm comprises at least three platforms, namely a base platform, a joint platform, and an effector platform, with movable joint means and linear actuators supportively spaced between and connecting the platforms. Multiple longitudinal member means, such as a plurality of intersecting bundles, provide spacing between the platforms. The plurality of intersecting bundles is preferably an odd plurality, and each of the bundles preferably comprises an odd plurality of longitudinal member.

The bundles may have movably engageable member retaining means or the movable joint itself may have means for adjusting the resistance to movement of the movable joint means.

In the preferred embodiment, the platforms connect with the spacing means and the actuator means in a triangular configuration, preferably in an equilateral triangular configuration. The effector platform is adapted to engage robotics devices, such as a robotic hand, an end effector, a gripper, or other robotics fixtures. The actuators are driven by hydraulic, pneumatic, mechanical, magnetic, or electrical drive means, or the like.

One object of the present invention is to provide rapid robotic movement throughout at least seven degrees of freedom within a hemispherical workspace.

Another object of the present invention is to provide long-term, reliability in a relatively inexpensive to construct robot.

One advantage of the present invention is that the preferred embodiment thereof has up to approximately sixteen times the strength to weight ratio of typical prior art devices.

Another advantage of the present invention is that it can be pneumatically, hydraulically, electrically, or magnetically driven and utilizes linear actuators rather than rotational devices.

Still another advantage of the instant invention is that it can be maintained by relatively unskilled individuals and that it requires relatively low amounts of maintenance compared to prior art devices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

FIGS. 4, 5, 6, 7, 8 and 9 show different types of linear actuators that can be utilized to practice the invention.

DETAILED DESCRIPTION OF THE PREFERRED EMBODIMENTS OF THE INVENTION (BEST MODES FOR CARRYING OUT THE INVENTION)

Figure 1:
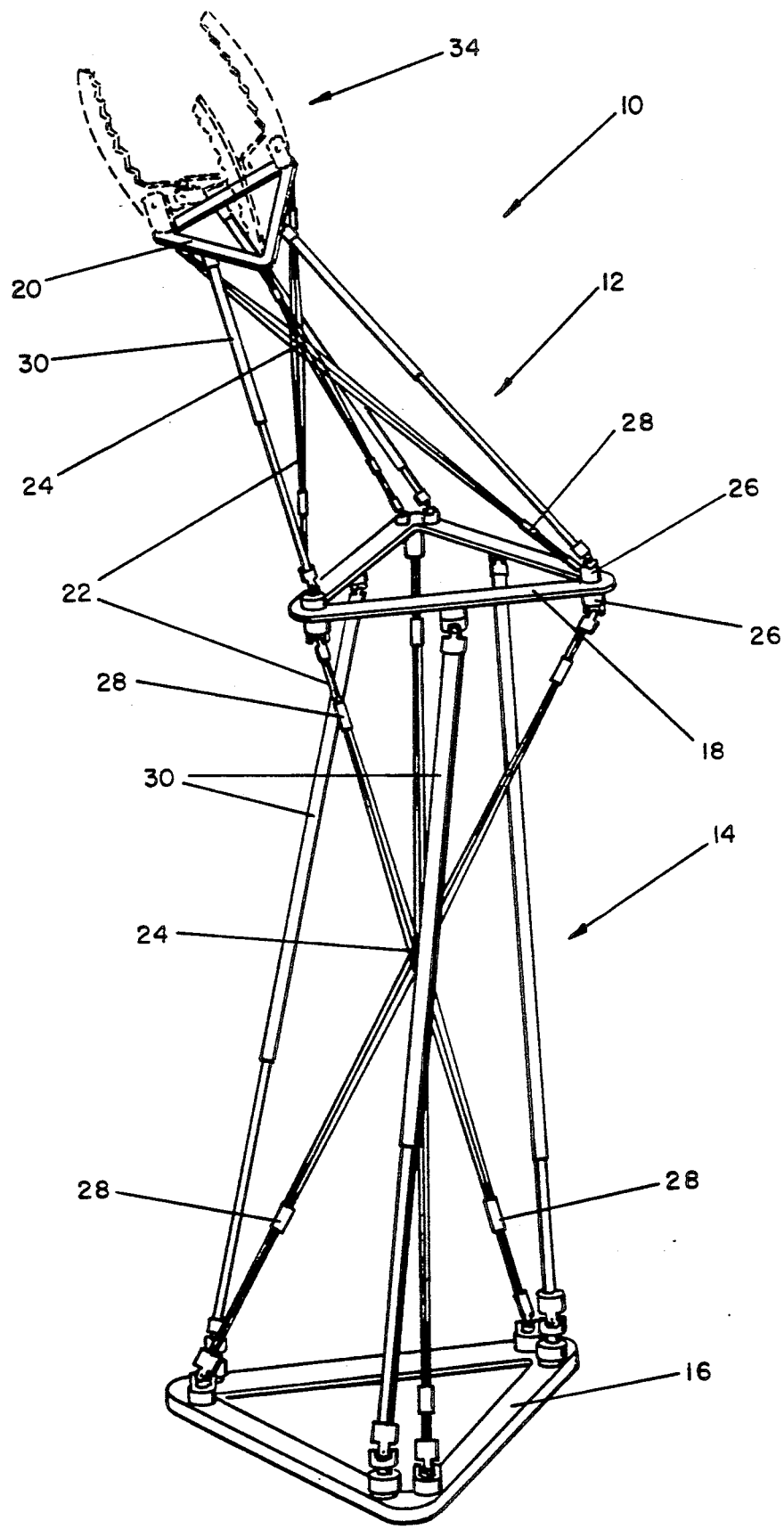
FIG. 1 illustrates the preferred embodiment of the present invention.

Reference is now made to FIG. 1 which illustrates the preferred basic embodiment of the invention, a robotic arm 10 comprising two sections 12 and 14. A base platform 16, a joint platform 18, and an effector platform 20 are connected by multiple longitudinal members 22. The longitudinal members 22 connect to each platform at platform connections (e.g. 26). The longitudinal members 22, which comprise intersecting or interwoven bundles of wire or single wires, intersect to form an interwoven movable joint 24. The movability of this joint 24 may be controllable by the stiffness of the joint 24 itself or by collars 28 which are slidably movable on the wire bundles 22 and hence can be used to tighten or loosen the wires bundled into joint 24, thereby controlling the resistance to movement provided by joint 24. Actuators 30, disposed between and connecting the platforms 16, 18, and 20, provide movement of the robotic structure.

Figure 3:
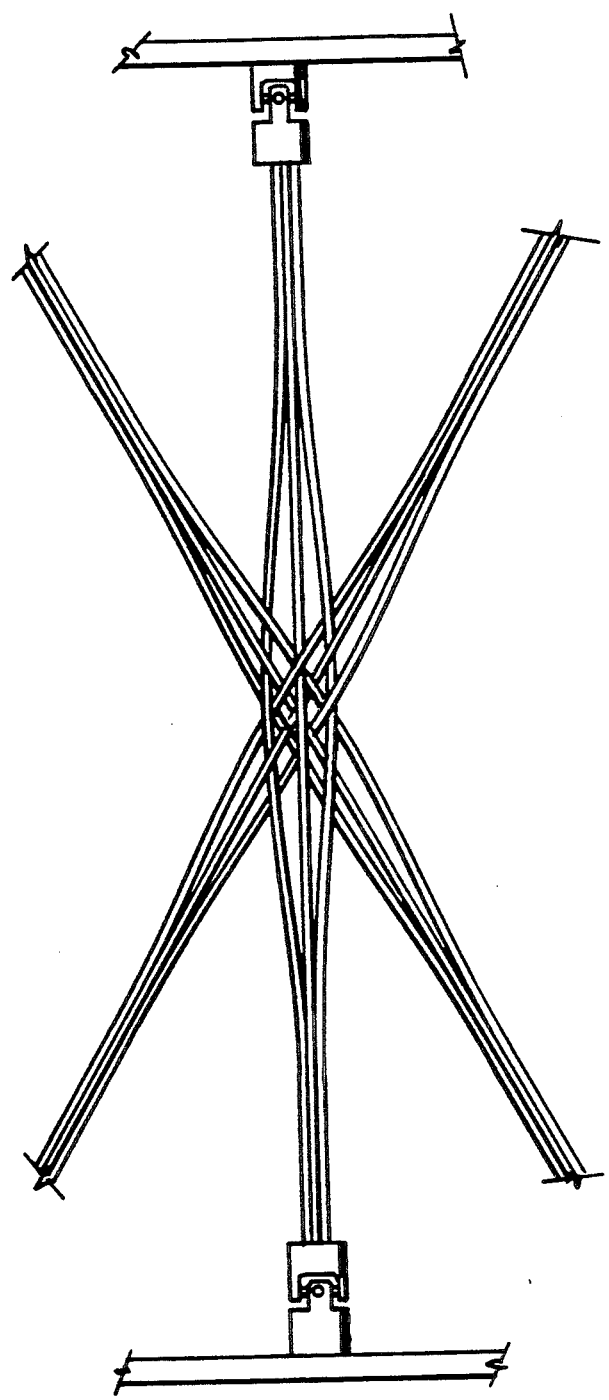
FIG. 3 illustrates the preferred movable joint of the invention.
Figure 6:
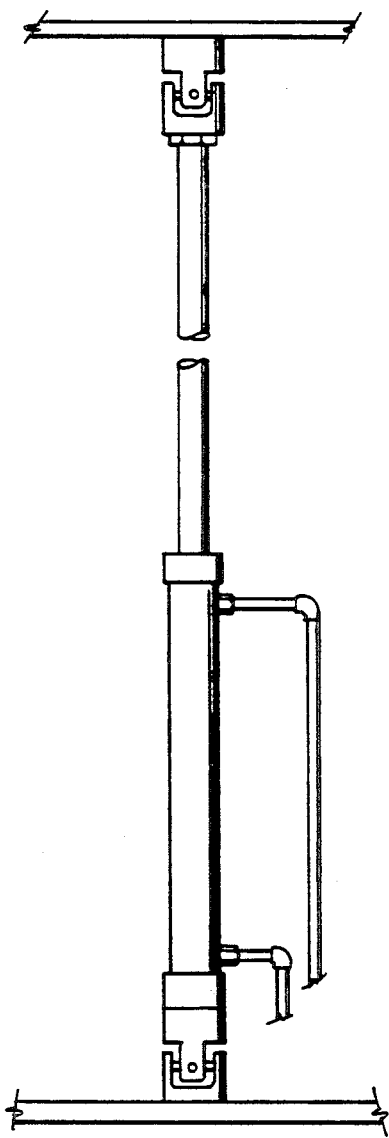
Figure 7:
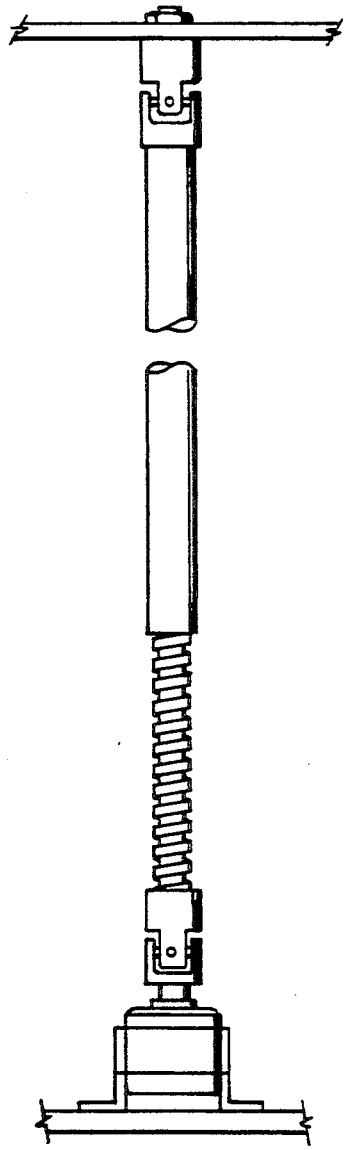
Figure 8:
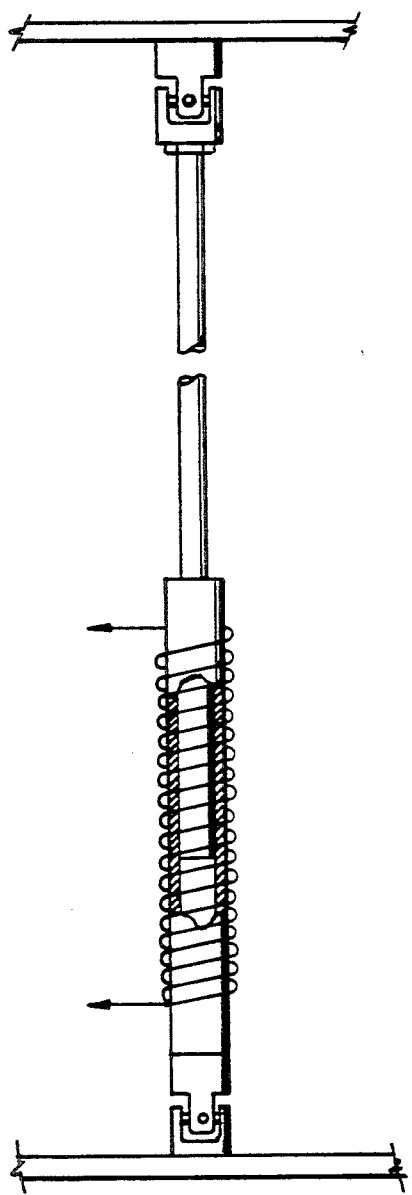
Figure 9:
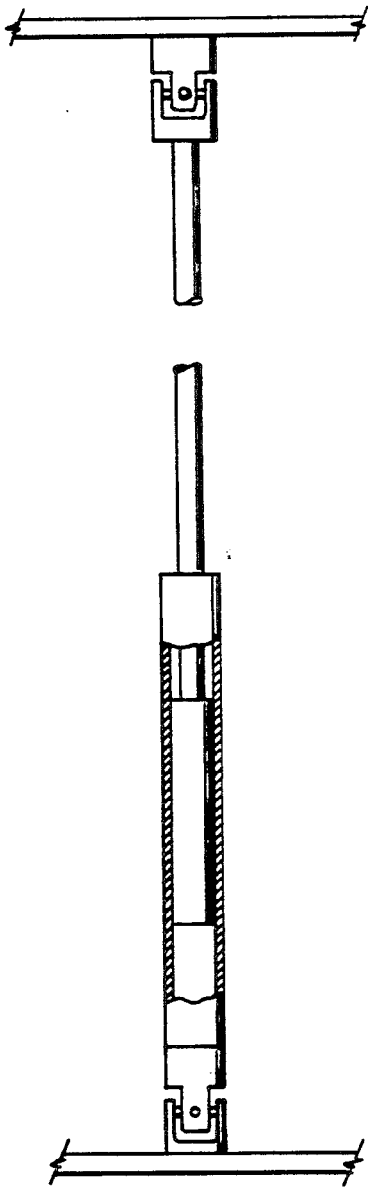

In the preferred embodiment, the longitudinal members 22 comprise a plurality of wires, preferably an odd number of wires. The various woven wire joints useful in accordance with the invention are described in detail in co-pending application Ser. No. 07/319,653, the teachings of which are incorporated herein by reference. The preferred joint 24 for the purposes of the robotic arm is illustrated in FIG. 3.

In the preferred embodiment of FIG. 1, six linear actuators 30 control the movement of the two-section robotic arm shown therein. As can be seen, the three actuators 30 per arm section are all that are needed to provide arm movement within six degrees of freedom. Additional degrees of freedom are provided by the robotic fixture 34. A simple gripper, as the robotic fixture 34, would provide the seventh degree of freedom. More complex robotics fixtures 34, such as a movable hand-type fixture, would provide further degrees of freedom.

Actuator elements 30 are hydraulically, pneumatically, electrically, or magnetically linearly actuatable as hereinafter disclosed. These actuator elements 30 serve to lengthen and shorten their actuator members extending between the platforms to provide movement of the robotics arm. The actuator elements 30 are preferably connected midway on the joint platform 18 between the connections 26 of the longitudinal members 22 to the platforms 16 and 20, as shown in FIG. 1. The movement of the linear actuators 30 can be controlled automatically, such as by computer, as also hereinafter described.

The linear actuators 30 may be controlled by either digital or analog controllers, such as electromagnetic valves. FIGS. 4–9 show several various linear actuators which are useful in accordance with the invention. In the case of hydraulic or pneumatic actuation, fluid motion control can be achieved either by digital or analog controls, and the linear actuators may be, for example, magnetic induction or magnetic coil driven or comprise motorized ball screws for linear actuation. The effector may be actuated either hydraulically, pneumatically, or electromagnetically.

The computer controlled robotic actuation is prismatic and can be achieved by microprocessor controlled pneumatic linear actuators, hydraulic linear actuators, or controlled motors which can, for example, create linear motion using ball-bearing screws, gears, cables, pulleys, and the like. Microprocessor controlled coil-guns or other magnetic induction liner actuators can also be used.

In the preferred embodiment, the platforms 16, 18, and 20 comprise substantially equilateral triangles, as illustrated in FIGS. 1, 2, 10, and 11. The effector or gripper platform 20 is used as a mounting base for a fixture 34, such as a robotic hand, an end effector, a gripper, or any other robotics fixture. The preferred embodiment shown in FIG. 1, with the equilateral triangular configuration, has a strength-to-weight ratio of up to sixteen times that of typical prior art robotics arms. The platform connectors 26 may be conventionally available joints, such as universal joints, ball-and-socket joints, and the like. The platforms 16, 18, and 20 and actuators 30 are preferably circularly tubular and made of metal or plastic elements or other suitable strong, lightweight material. They could be of an oval, square, or other cross-sectional shape.

Computer control algorithms and associated mathematics are used to operate the preferred embodiment. Given the desired location and orientation of the robotics fixture 34 in a hemispherical work space, the six values of the linear displacements of the six actuator elements 30 are used to place the robotics fixture 34 correctly at a desired position and with a desired orientation.

Figure 2:
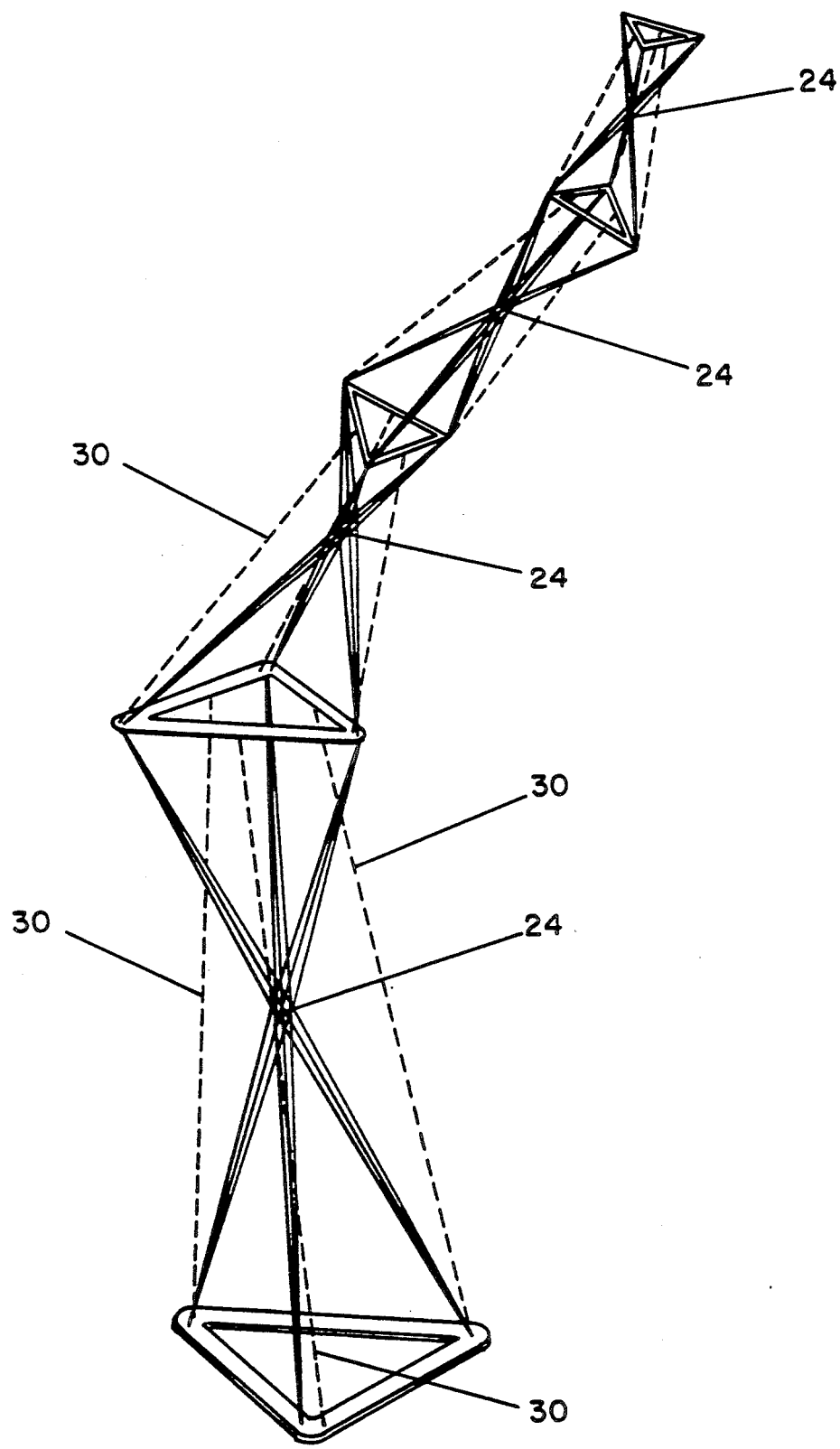
FIG. 2 illustrates another embodiment of the invention having multiple platforms.

FIG. 2 illustrates another robotic arm embodiment of the invention having five platforms. Intersecting or interwoven wires form interwoven movable joints 24. The dashed lines between the platforms represent linear actuators 30. The discussion above concerning the embodiment of FIG. 1 is also applicable to the FIG. 2 embodiment, except that multiple platforms are utilized to provide more than seven degrees of freedom of movement. As can be appreciated by those skilled in the art, the robotic arm of the present invention may comprise any number of two or more platforms with movable joints and linear actuators therebetween.

Figure 10:
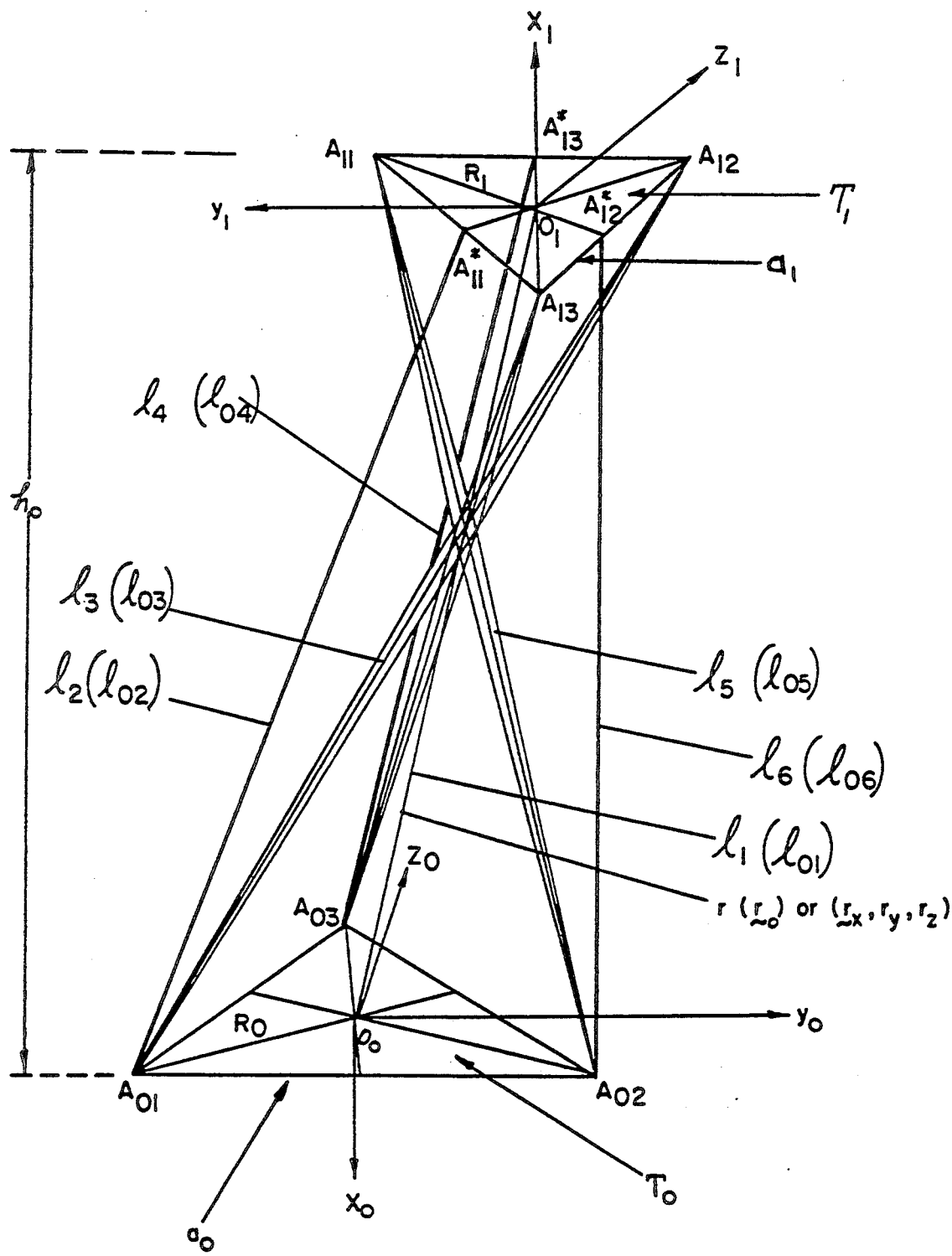
FIGS. 10 and 11 illustrate kinematical diagrams of the arm of the invention.
Figure 11:
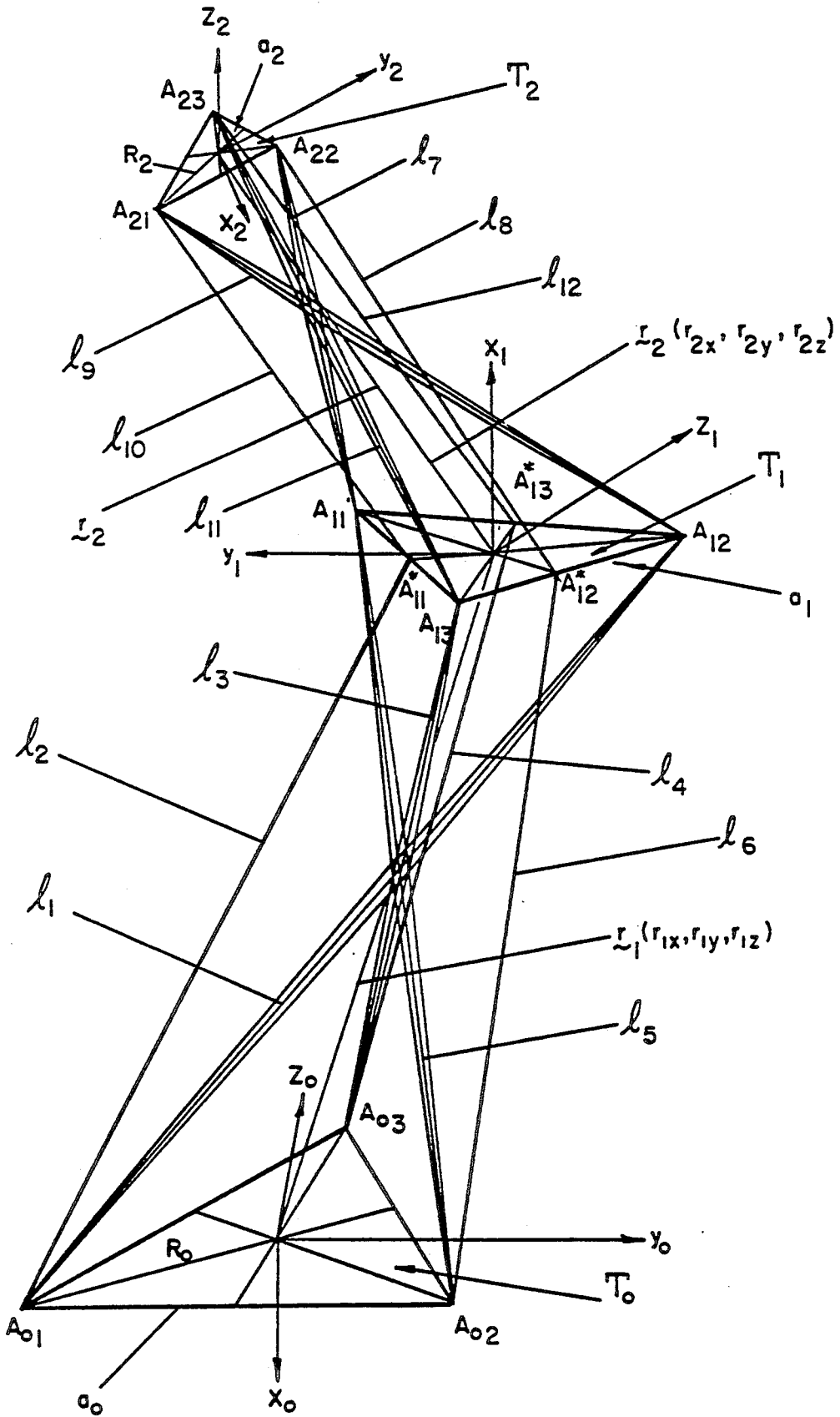

Let us refer not to FIGS. 10 and 11, which depict kinematic embodiments of the invention. The quantities in parentheses in these Figures denote the values of these parameters in an equilibrium situation.

With reference to FIG. 10, note that for an analytical representation of the kinematic of this embodiment, a fixed reference rectangular cartesian frame is assumed with its origin at the point of intersection of angle bisectors or the medians of the base platform, which is herein denoted $T_0$, corresponding to rectangular Cartesian Frame $X_0$, $Y_0$, $X_0$, and is considered fixed to the center of the joint platform which is denoted herein as $T_1$, corresponding to rectangular cartesian frame $X_1$, $Y_1$, $Z_1$.

The locations of points $A_{01}$, $A_{02}$, $A_{03}$, $A_{11}$, $A_{12}$, and $A_{13}$, are given by $$R_{Ao1} = ((\sqrt{3}/6)a_o, -(a_o/2), 0)^T \tag{1}$$

$$R_{Ao2} = ((\sqrt{3}/6)a_o,(1/2)\,a_o, 0)^T \tag{2}$$

$$R_{Ao3} = ((-\sqrt{3}/3)a_o, 0, 0)^T \quad (3)$$

with respect to the base frame $T_0$ and by $$R_{A11} = ((+\sqrt{3}/6)a_1, +(1/2)a_1, 0)^T \quad (4)$$

$$R_{A12} = ((3/6)a_1, -(1/2)a_1, 0)^T \quad (5)$$

$$R_{A13} = ((-\sqrt{3}/6)a_1, 0, 0)^T \quad (6)$$

with respect to the platform frame $T_1$. Here, T denotes the transportation of a vector.

Consider an equilibrium reference position of the upper triangle $T_1$ with respect to the lower triangle $T_0$ such that they are parallel with a perpendicular separation of $h_0$ for which all lengths $l_1$ through $l_6$ are equal to $l_{01}$ through $l_{06}$. Under these circumstances, the position of $O_1$, the origin of the frame $T_1$ with respect to $T_0$, is given by a vector $r_0$ which is generally $\underline{r}$.

In the reference configuration the coordinate frame $T_1$ can be expressed with respect to the frame $T_0$ utilizing $4\times 4$ homogeneous transformation as follows:

$$[T_1]_o = \begin{bmatrix} -1 & 0 & 0 & -b_o \\ 0 & 1 & 0 & 0 \\ 0 & 0 & 1 & h_o \\ 0 & 0 & 0 & 1 \end{bmatrix}. \quad (7)$$

Now let the origin of the $T_1$ frame in the upper joint platform move to an arbitrary position $\underline{r}=(r_x, r_y, r_z)^T$ and orientation $\theta$, $\phi$, and $\psi$ are such that $\theta$, $\phi$, and $\psi$ are the corresponding angles, in right-handed fashion, between the orthogonal axes $(x_0, x_1)$, $(y_0, y_1)$, and $(z_0, z_1)$, respectively. In this arbitrary position and orientation, the frame $T_1$ can be expressed with respect to the frame $T_0$ using another $4\times 4$ homogeneous transformation $[T_1]$ as follows:

$$[T_1] = \begin{bmatrix} \cos\theta & \cos(x_1, y_0) & \cos(x_1, z_0) & r_x \\ \cos(y_1, x_0) & \cos\phi & \cos(y_1, z) & r_y \\ \cos(z_1, x_0) & \cos(z_1, y_0) & \cos\psi & r_z \\ 0 & 0 & 0 & 1 \end{bmatrix}, \quad (8)$$

or $$[T_1] = \begin{bmatrix} d_{11} & d_{12} & d_{13} & r_x \\ d_{21} & d_{22} & d_{23} & r_y \\ d_{31} & d_{32} & d_{33} & r_z \\ 0 & 0 & 0 & 1 \end{bmatrix} \quad (9)$$

where $d_{ij}, i,j=1,2,3$ are the direction cosines between the $T_0$ and the $T_1$ frames, i.e., $$d_{ij} = \cos(x_{li}, x_{jo}), \quad (10)$$

$$x_{li} = (x_1, y_1, z_1)^T, \quad (11)$$

$$(x_{jo}) = (x_0, y_0, z_0)^T. \quad (12)$$

Thus, the location of all points on the upper triangle can be obtained with respect to the $T_1$ frame such that $$0_1 \rightarrow r_{o1} = (0, 0, 0)^T \quad (13)$$

$$A_{11} \rightarrow R_{A11} = ((\sqrt{3}/6)a_1, (1/2)a_1, 0)^T \quad (14)$$

$$A_{12} \rightarrow R_{A12} = (\sqrt{3}/6)a_1, -(1/2)a_1, 0)^T \quad (15)$$

$$A_{13} \rightarrow R_{A13} (-(\sqrt{3}/3)a_1, 0, 0)^T \quad (16)$$

$$A_{11}^* \rightarrow R_{A11}^* (-(\sqrt{3}/12)a_1, (1/4)a_1, 0)^T \quad (17)$$

$$A_{12}^* \rightarrow R_{A12}^* (-(\sqrt{3}/12)a_1, -(1/4)a_1, 0)^T \quad (18)$$

$$A_{13}^* \rightarrow R_{A13}^* ((\sqrt{3}/6)a_1, 0, 0)^T \quad (19)$$

and $$r_{A11} = \begin{bmatrix} x \\ y \\ z \\ 1 \end{bmatrix}_{A11} = [T] R_{A11}^{(H)} = [T] \begin{bmatrix} (\sqrt{3}/6)a_1 \\ (1/2)a_1 \\ 0 \\ 1 \end{bmatrix} = \quad (20)$$

$$\begin{bmatrix} (\sqrt{3}/6)a_1 d_{11} + (1/2)a_1 d_{12} + r_x \\ (\sqrt{3}/6)a_1 d_{21} + (1/2)a_1 d_{22} + r_y \\ (\sqrt{3}/6)a_1 d_{31} + (1/2)a_1 d_{32} + r_z \\ 1 \end{bmatrix}$$

where $R_{A11}^{(H)}$ is the homogeneous representation of $\underline{R}_{A11}$. Similarly, $$r_{A12} = \begin{bmatrix} x \\ y \\ z \\ 1 \end{bmatrix}_{A12} = [T] R_{A12}^{(H)} = \begin{bmatrix} (\sqrt{3}/6)a_1 \\ -(1/2)a_1 \\ 0 \\ 1 \end{bmatrix} = \quad (21)$$

$$\begin{bmatrix} d_{11}(3/6)a_1 - (1/2)a_1 d_{12} + r_x \\ (\sqrt{3}/6)a_1 d_{21} - (1/2)a_1 d_{22} + r_y \\ (\sqrt{3}/6)a_1 d_{31} - (1/2)a_1 d_{32} + r_z \\ 1 \end{bmatrix}$$

where $R_{A11}^{(H)}$ is the homogeneous representation of $\underline{R}_{A11}$. Similarly, $$r_{A13} = \begin{bmatrix} x \\ y \\ z \\ 1 \end{bmatrix}_{A13} = [T_1] R_{A11}^{(H)} = [T_1] \begin{bmatrix} -(\sqrt{3}/3)a_1 \\ 0 \\ 0 \\ 1 \end{bmatrix} = \quad (22)$$

$$r_{A11}^* = \begin{bmatrix} x \\ y \\ z \\ 1 \end{bmatrix}_{A11^*} = [T_1] R_{A11}^{*H} = [T_1] \begin{bmatrix} -(\sqrt{3}/12)a_1 \\ (1/4)a_1 \\ 0 \\ 1 \end{bmatrix} = \begin{bmatrix} -(\sqrt{3}/3)a_1 d_{11} + r_x \\ -(\sqrt{3}/3)a_1 d_{21} + r_y \\ -(\sqrt{3}/3)a_1 d_{31} + r_z \\ 1 \end{bmatrix} \quad (23)$$

$$= \begin{bmatrix} -(\sqrt{3}/12)a_1 d_{11} + (1/4)a_1 d_{12} + r_x \\ -(\sqrt{3}/12)a_1 d_{21} + (1/4)a_1 d_{22} + r_y \\ -(\sqrt{3}/12)a_1 d_{31} + (1/4)a_1 d_{32} + r_z \\ 1 \end{bmatrix}$$

$$r_{A12}^* = \begin{bmatrix} x \\ y \\ z \\ 1 \end{bmatrix}_{A12^*} = [T_1] R_{A12}^{*H} = [T_1] \begin{bmatrix} -(\sqrt{3}/12)a_1 \\ -(1/4)a_1 \\ 0 \\ 1 \end{bmatrix} = \quad (24)$$

$$\begin{bmatrix} -(\sqrt{3}/12)a_1 d_{11} + (1/4)a_1 d_{12} + r_x \\ -(\sqrt{3}/12)a_1 d_{21} + (1/4)a_1 d_{22} + r_y \\ -(\sqrt{3}/12)a_1 d_{31} + (1/4)a_1 d_{32} + r_z \\ 1 \end{bmatrix}$$

and $$r_{A13}^* = \begin{bmatrix} x \\ y \\ z \\ 1 \end{bmatrix}_{A13^*} = [T_1] R_{A23}^H = [T_1] \begin{bmatrix} (\sqrt{3}/6)a_1 \\ 0 \\ 0 \\ 1 \end{bmatrix} = \quad (25)$$

$$\begin{bmatrix} (\sqrt{3}/6)a_1 d_{11} + r_x \\ (\sqrt{3}/6)a_1 d_{21} + r_y \\ (\sqrt{3}/6)a_1 d_{31} + r_z \\ 1 \end{bmatrix}$$

Note that, $$l_i^2 = (x_{A12} - x_{Ao1})^2 + (y_{A12} - y_{Ao1})^2 + (z_{A12} - z_{Ao1})^2, \quad i = 1.2 \ldots 6, \quad (26)$$

$$l_1^2 = ((\sqrt{3}/6)a_1 d_{11} - (1/2)a_1 d_{12} + r_x - (\sqrt{3}/6)a_o)^2 + \quad (27)$$
$$((\sqrt{3}/6)a_1 d_{21} - (1/2)a_1 d_{22} + r_y + (a_o/2))^2 +$$
$$((\sqrt{3}/6)a_1 d_{31} - (1/2)a_1 d_{32} + r_z)^2$$

$$l_2^2 = (x_{A11}^* - x_{Ao1})^2 + (y_{A11}^* - y_{Ao1})^2 + (z_{A11}^* - z_{Ao1})^2 \quad (28)$$

$$l_3^2 = (x_{A13} - x_{Ao3})^2 + (y_{A13} - y_{Ao3})^2 + (z_{A13} - z_{Ao3})^2 \quad (29)$$

$$l_4^2 = (x_{A13}^* - x_{Ao3})^2 + (y_{A13}^* - y_{Ao3})^2 + (z_{A13}^* - z_{Ao3})^2 \quad (30)$$

$$l_5^2 = (x_{A11} - x_{Ao2})^2 + (y_{A11} - y_{Ao2})^2 + (z_{A11} - z_{Ao2})^2 \quad (31)$$

$$l_6^2 = (x_{A12}^* - x_{Ao2})^2 + (y_{A12}^* - y_{Ao2})^2 + (z_{A12}^* - z_{Ao2})^2 \quad (32)$$

$$l_2^2 = (-(\sqrt{3}/12)a_1 d_{11} + (1/4)a_1 d_{12} + r_x - (\sqrt{3}/6)a_o)^2 + \quad (33)$$
$$(-(\sqrt{3}/6)a_1 d_{21} + (1/4)a_1 d_{22} + r_y + (a_o/2))^2 +$$
$$(-(\sqrt{3}/6)a_1 d_{31} + (1/4)\, a_1 d_{32} + r_z)^2$$

$$l_3^2 = (-(\sqrt{3}/3)a_1 d_{11} + r_x + (\sqrt{3}/3)a_o)^2 + \quad (34)$$
$$(-(\sqrt{3}/3)a_1 d_{21} + r_y)^2 + (-(\sqrt{3}/3)a_1 d_{31} + r_z)^2$$

$$l_4^2 = ((\sqrt{3}/6)a_1 d_{11} + r_x + (\sqrt{3}/3)a_o)^2 + \quad (35)$$
$$((\sqrt{3}/6)a_1 d_{21} + r_y)^2 + (-(\sqrt{3}/6)a_1 d_{31} + r_z)^2$$

$$l_5^2 = ((\sqrt{3}/6)a_1 d_{11} + (1/2)a_1 d_{12} + r_x - (\sqrt{3}/6)a_o)^2 + \quad (36)$$
$$((\sqrt{3}/6)a_1 d_{21} + (1/2)a_1 d_{22} + r_y - (1/2)a_o)^2 +$$
$$((\sqrt{3}/6)a_1 d_{31} + (1/2)\, a_1 d_{32} + r_z)^2$$

$$l_6^2 = (-(\sqrt{3}/12)a_1 d_{11} - (1/4)a_1 d_{12} + r_x - (\sqrt{3}/6)a_o)^2 + \quad (37)$$
$$((\sqrt{3}/12)a_1 d_{21} - (1/4)a_1 d_{22} + r_y - (1/2)a_o)^2 +$$
$$(-(\sqrt{3}/12)a_1 d_{31} + (1/4)\, a_1 d_{32} + r_z)^2$$

Equations (26)–(37) represent a set of equations for the solution of the inverse kinematics problem of such a robot manipulator.

It should be noted that given a desired position of the origin of the $T_1$ frame in the upper joint platform, i.e., $r_x$, $r_y$, $r_z$, and a desired orientation of $T_1$ with respect to the base frame $T_0$, i.e., $\theta$, $\phi$, and $\psi$, the desired leg lengths $l_i$, $i = 1,2,3,4,5,6$ can be explicitly determined. These $l_i$'s determine the amount of computer-controlled prismatic extension of the various linear actuators 30 in FIG. 2.

In the embodiment shown in FIG. 10, the lengths $l_1$, $l_3$, and $l_5$ are fixed and basically equal to some lengths $l_{o1}$, $l_{o3}$, and $l_{o5}$. This means that equations (32), (34) and (36) now completely define the boundaries of the work space of the robot and equations (33), (35), and (37) can be used to determine the actuation lengths necessary to generate the desired attitude (position+orientation) of the upper platform. Furthermore, equations (32), (34), and (36) determine the values $r_x$, $r_y$, and $r_z$ as a function of $\theta$, $\phi$, and $\psi$, given that $l_1$, $l_3$, and $l_5$ are prescribed. Therefore, given the values of $l_1$, $l_3$, and $l_5$ and the desired orientation of the frame $T_1$ with respect to $T_0$, equations (32)–(37) completely define an algorithm to achieve computer-controlled positioning of the first platform.

Similar analyses describe the kinematics and the solution to the inverse kinematics problem of the second and, if desired, the third platforms (see FIG. 11).

To extend to multiple platforms, the following is a similar analysis for the frame $T_2$, which is denoted by a Cartesian Frame $x_2$, $y_2$, $z_2$, with respect to the frames $T_1$ and $T_0$, as depicted in FIG. 11. Note that in this case $$l_7^2 = (x_{A22} - x_{A11})^2 + (y_{A22} - y_{A11})^2 + (z_{A22} - z_{A11})^2, \quad (38)$$

$$l_8^2 = (x_{A22} - x_{A12}^*)^2 + (y_{A22} - y_{A12}^*)^2 + (z_{A22} - z_{A12}^*)^2, \quad (39)$$

$$l_9^2 = (x_{A21} - x_{A12})^2 + (y_{A21} - y_{12})^2 + (z_{A21} - z_{A12}^*)^2, \quad (40)$$

$$l_{10}^2 = (x_{A21} - x_{A11}^*)^2 + (y_{A21} - y_{A11}^*)^2 + (z_{A21} - z_{A11}^*)^2, \quad (41)$$

$$l_{11}^2 = (x_{A23} - x_{A13})^2 + (y_{A23} - y_{A13})^2 + (z_{A23} - z_{A13})^2, \quad (42)$$

$$l_{12}^2 = (x_{A23} - x_{A13}^*)^2 + (y_{A23} - y_{A13}^*)^2 + (z_{A23} - z_{A13}^*)^2, \quad (43)$$

$$r_{A21} = \begin{bmatrix} x \\ y \\ z \\ 1 \end{bmatrix}_{A21} = T_0^2 R_{A21}^H = T_0^2 \begin{bmatrix} (\sqrt{3}/6)a_2 \\ -(a_2/2) \\ 0 \\ 1 \end{bmatrix} = \quad (44)$$

$$\begin{bmatrix} (\sqrt{3}/6)a_2 d_{11}^* - (1/2)d_{12}^* + r_x \\ (\sqrt{3}/6)a_2 d_{21}^* - (1/2)a_2 d_{32}^* + r_y \\ (\sqrt{3}/6)a_2 d_{31}^* - (1/2)a_2 d_{22}^* + r_z \end{bmatrix} \quad (45)$$

$$r_{A22} = \begin{bmatrix} x \\ y \\ z \\ 1 \end{bmatrix}_{A22} = T_0^2 R_{A22}^H = T_0^2 \begin{bmatrix} (\sqrt{3}/6)a_2 \\ (a_2/2) \\ 0 \\ 1 \end{bmatrix} =$$

$$\begin{bmatrix} (\sqrt{3}/6)a_2 d_{11}^* - (1/2)d_{12}^* + r_x \\ (\sqrt{3}/6)a_2 d_{21}^* - (1/2)a_2 d_{32}^* + r_y \\ (\sqrt{3}/6)a_2 d_{31}^* - (1/2)a_2 d_{22}^* + r_z \end{bmatrix}$$

$$r_{A23} = \begin{bmatrix} x \\ y \\ z \\ 1 \end{bmatrix}_{A23} = T_0^2 R_{A23}^H = T_0^2 \begin{bmatrix} -(\sqrt{3}/3)a_2 \\ 0 \\ 0 \\ 1 \end{bmatrix} = \quad (46)$$

$$\begin{bmatrix} -(\sqrt{3}/3)a_2 d_{11}^* + r_x \\ -(\sqrt{3}/3)a_2 d_{21}^* + r_y \\ -(\sqrt{3}/3)a_2 d_{31}^* + r_z \\ 1 \end{bmatrix}$$

where $d^*_{ij}$ are the direction cosines in $T_0^2$ transformations. Thus $$l_7^2 = ((\sqrt{3}/6)a_2 d_{11}^* - (1/2)a_2 d_{12}^* + r_x - (\sqrt{3}/6)a_1 d_{11} - \quad (47)$$

$$(1/2)a_1 d_{12} - r_{1x})^2 + ((\sqrt{3}/6)a_2 d_{21}^* - (1/2)a_2 d_{32} + r_y -$$

$$(\sqrt{3}/6)a_1 d_{21} - (1/2)a_1 d_{22} - r_{1y})^2 + ((\sqrt{3}/6)a_2 d_{31}^* -$$

$$(1/2)a_2 d_{22}^* + r_z - (\sqrt{3}/6)a_1 d_{31} - (1/2)a_1 d_{32} - r_{1z})^2$$

$$l_8^2 = ((\sqrt{3}/6)a_2 d_{11}^* - (1/2)a_2 d_{12}^* + r_x + (\sqrt{3}/12)a_1 d_{11} - \quad (48)$$

$$(1/4)a_1 d_{12} - r_{1x})^2 + ((\sqrt{3}/6)a_2 d_{21}^* - (1/2)a_2 d_{32} + r_y +$$

$$(\sqrt{3}/12)a_1 d_{21} + (1/4)a_1 d_{22} - r_{1y})^2 + ((\sqrt{3}/6)a_2 d_{31}^* +$$

$$(1/2)a_2 d_{22}^* + r_z + (\sqrt{3}/12)a_1 d_{31} + (1/4)a_1 d_{32} - r_{1z})^2$$

$$l_9^2 = ((\sqrt{3}/6)a_2 d_{11}^* - (1/2)a_2 d_{12}^* + r_x - (\sqrt{3}/6)a_1 d_{11} + \quad (49)$$

$$(1/2)a_1 d_{12} - r_{1x})^2 + ((\sqrt{3}/6)a_2 d_{21}^* - (1/2)a_2 d_{32}^* + r_y -$$

$$(\sqrt{3}/6)a_1 d_{21} + (1/2)a_1 d_{22} - r_{1y})^2 + ((\sqrt{3}/6)a_2 d_{31}^* -$$

$$(1/2)a_2 d_{22}^* + r_z - (\sqrt{3}/6)a_1 d_{31} + (1/2)a_1 d_{32} - r_{1z})^2$$

$$l_{10}^2 = ((\sqrt{3}/6)a_2 d_{11}^* - (1/2)a_2 d_{12}^* + r_x + (\sqrt{3}/12)a_1 d_{11} - \quad (50)$$

$$(1/4)a_1 d_{12} - r_{1x})^2 + ((\sqrt{3}/6)a_2 d_{21}^* - (1/2)a_2 d_{32}^* + r_y +$$

$$(\sqrt{3}/12)a_1 d_{21} - (1/4)a_1 d_{22} - r_{1y})^2 + ((\sqrt{3}/6)a_1 d_{31}^* -$$

$$(1/2)a_2 d_{22}^* + r_z + (\sqrt{3}/12)a_1 d_{31} - (1/4)a_1 d_{32} - r_{1z})^2$$

$$l_{11}^2 = ((\sqrt{3}/3)a_2 d_{11}^* + r_x + (\sqrt{3}/3)a_1 d_{11} - r_{1x})^2 + \quad (51)$$

$$((\sqrt{3}/3)a_2 d_{21}^* + r_y + (\sqrt{3}/3)a_1 d_{21} - r_{1y})^2 +$$

$$((\sqrt{3}/3)a_2 d_{31}^* + r_z + (\sqrt{3}/3)a_1 d_{31} - r_{1z})^2$$

$$l_{12}^2 = ((\sqrt{3}/3)a_2 d_{11}^* + r_x + (\sqrt{3}/6)a_1 d_{11} - r_{1x})^2 + \quad (52)$$

$$((\sqrt{3}/3)a_2 d_{21}^* + r_y - (\sqrt{3}/6)a_1 d_{21} - r_{1y})^2 +$$

$$((\sqrt{3}/3)a_2 d_{31}^* + r_z - (\sqrt{3}/6)a_1 d_{31} - r_{1z})^2$$

Note that the transformations $T_0$, $T_1$, and $T_2$ can also be expressed in terms of the associated Euler's angles $\theta$, $\phi$, and $\psi$, such that $$d_{11} = C\theta, \quad d_{12} = C\theta S\phi S\psi - S\theta C\psi \quad (53)$$

$$d_{13} = C\theta S\phi C\psi + S\theta S\psi, \quad d_{21} = S\phi C\phi \quad (54)$$

$$d_{22} = S\theta S\phi S\psi + C\theta S\psi \quad (55)$$

$$d_{23} = S\theta S\phi C\psi - C\phi S\psi \quad (56)$$

$$d_{31} = S\phi, \quad d_{32} = C\phi S\psi, \quad d_{33} = C\phi C\psi. \quad (57)$$

where the symbols C and S stand for Cosine and Sine of an angle.

All $d_{ij}$'s can be expressed in terms of the three Euler's angles $\theta$, $\phi$, and $\psi$, as described in M. Shahinpoor, *A Robot Engineering Test*, Harper and Row Publishers, New York, 1987, chapter 2.

Now given the position and the orientation of the frame $\underline{T}_2$ with respect to the reference base frame $\underline{T}_0$, it is true that $$\underline{T}_0^2 = \underline{T}_0^1 \underline{T}_1^2, \tag{58}$$

where $\underline{T}_j^i$ is the 4×4 homogeneous transformation describing the position and the orientations of frame $\underline{T}_i$ with respect to frame $\underline{T}_j$. In terms of the Euler's angles $\theta_1$, $\phi_1$, $\psi_1$, and $\theta_2$, $\phi_2$, $\psi_2$, and the position vectors $r_1 = (r_{1x}, r_{1y}, r_{1z})$ and $r_2 = (r_{2x}, r_{2y}, r_{2z})$ with respect to $\underline{T}_0$ and $\underline{T}_1$ frames, respectively, the following relationships hold true.

$$\text{Euler}(\theta_1, \phi_1, \psi_1, r_{1x}, r_{1y}, r_{1z}) \text{Euler}(\theta_2, \phi_2, \psi_2, r_{2x}, r_{2y}, r_{2z}) = \text{Euler}(\theta, \phi, \psi, r_x, r_y, r_z), \tag{59}$$

where $$T_0^1 = \text{Euler}(\theta_1, \phi_1, \psi_1, r_{1x}, r_{1y}, r_{1z}), \tag{60}$$

$$T_1^2 = \text{Euler}(\theta_2, \phi_2, \psi_2, r_{2x}, r_{2y}, r_{2z}), \tag{61}$$

$$T_0^2 = \text{Euler}(\theta, \phi, \psi, r_x, r_y, r_z). \tag{62}$$

Now given $T_0^2$ in order to find the 6 actuation lengths $l_1, l_3, l_5, l_6, l_{10}$, and $l_{12}$ of FIG. 11 in terms of the known geometrical quantities $l_2, l_4, l_6, l_7, l_9, l_{11}, a_0, a_1, a_2$, one must solve 24 equations with 18 unknowns. The unknowns are $\theta, \phi, \psi, r_{1x}, r_{1y}, r_{1z}, \theta_2, \phi_2, \psi_2, r_{2x}, r_{2y}, r_{2z}, l_1, l_3, l_5, l_8, l_{10}$, and $l_{12}$. Note that under these circumstances $$\text{Euler}(\theta_1, \phi_1, \psi_1, r_{1x}, r_{1y}, r_{1z}) = \tag{63}$$

$$\begin{bmatrix} C\theta_1 & C\theta_1 S\phi_1 S\psi_1 - S\theta_1 C\psi_1 & C\theta_1 S\phi_1 C\psi_1 + S\theta_1 S\psi_1 & r_{1x} \\ S\theta_1 C\phi_1 & S\theta_1 S\phi_1 S\psi_1 + C\theta_1 C\psi_1 & S\theta_1 S\phi_1 C\psi_1 - C\theta_1 S\psi_1 & r_{1y} \\ -S\phi_1 & C\phi_1 S\psi_1 & C\phi_1 C\psi_1 & r_{1z} \\ 0 & 0 & 0 & 1 \end{bmatrix}$$

$$\text{Euler}(\theta_2, \phi_2, \psi_2, r_{2x}, r_{2y}, r_{2z}) = \tag{64}$$

$$\begin{bmatrix} C\theta_2 & C\theta_2 S\phi_2 S\psi_2 - S\theta_2 C\psi_2 & C\theta_2 S\phi_2 C\psi_2 + S\theta_2 S\psi_2 & r_{2x} \\ S\theta_2 C\phi_2 & S\theta_2 S\phi_2 S\psi_2 + C\theta_2 C\psi_2 & S\theta_2 S\phi_2 C\psi_2 - C\theta_2 S\psi_2 & r_{2y} \\ -S\phi_2 & C\phi_2 S\psi_2 & C\phi_2 C\psi_2 & r_{2z} \\ 0 & 0 & 0 & 1 \end{bmatrix}$$

$$\text{Euler}(\theta, \phi, \psi, r_x, r_y, r_z) = \tag{65}$$

$$\begin{bmatrix} C\theta & C\theta S\phi S\psi - S\theta C\psi & C\theta S\phi C\psi + S\phi S\psi & r_x \\ S\phi C\phi & S\theta S\phi S\psi + C\theta S\psi & S\theta S\phi C\psi - C\phi S\psi & r_y \\ -S\phi & C\phi S\psi & C\phi C\psi & r_z \\ 0 & 0 & 0 & 1 \end{bmatrix}$$

Thus, $$11 \rightarrow C\theta = C\theta_1 C\theta_2 + S\phi_2 C\phi_2 (C\phi_1 S\phi_1 S\psi_1 - S\theta_1 C\psi_1) - \tag{66}$$

$$S\phi(C\theta_1 S\phi_1 C\psi_1 + S\phi_1 S\psi_1)$$

-continued $$12 \rightarrow C\theta S\phi S\psi - S\theta C\psi = C\theta_1(C\theta_2 S\phi_2 S\psi_2 - S\theta_2 C\phi_2) + \tag{67}$$
$$(C\theta_1 S\phi_1 S\psi_1 - S\theta_1 C\psi_1)(S\theta_2 S\phi_2 S\psi_2 + C\theta_2 C\psi_2) +$$
$$C\phi_2 S\psi_2(C\theta_1 S\phi_1 C\psi_1 + S\phi_1 S\psi_1)$$

$$13 \rightarrow C\theta S\phi S\psi + S\theta S\psi = C\theta_1(C\theta_2 S\phi_2 S\psi_2 + S\theta_2 S\phi_2) + \tag{68}$$
$$(C\theta_1 S\phi_1 S\psi_1 - S\theta_1 C\psi_1)(S\theta_2 S\phi_2 C\psi_2 - C\theta_2 S\psi_2) +$$
$$C\phi_2 C\psi_2(C\theta_1 S\phi_1 C\psi_1 + S\phi_1 S\psi_1)$$

$$14 \rightarrow r_x = r_{2x} C\theta_1 + r_{2y}(C\theta_1 S\phi_1 S\psi_1 = S\theta_1 C\psi_1) + \tag{69}$$
$$r_{2z}(C\theta_1 S\phi_1 C\psi_1 + S\phi_1 S\psi_1) + r_{1x}$$

$$24 \rightarrow r_y = r_{2x}(S\phi_1 C\phi_1) + r_{2y}(S\theta_1 S\phi_1 S\psi_1 + \tag{70}$$
$$C\theta_1 C\psi_1) r_{2z}(S\theta_1 S\phi_1 C\psi_1 - C\phi_1 S\psi_1) + r_{1y}$$

$$34 \rightarrow r_z = r_{2x}(-S\phi_1) + r_{2y}(C\phi_1 S\psi_1) + r_{2z}(C\phi_1 C\psi_1) + r_{1z} \tag{71}$$

$$21 \rightarrow S\phi C\phi = C\theta_2(S\phi_1 C\phi_1) + S\phi_2 C\phi_2 (S\theta_1 S\phi_1 S\psi_1 + \tag{72}$$
$$C\theta_1 C\psi_1) - S\phi(S\theta_1 S\phi_1 C\psi_1 - C\theta_1 S\psi_1)$$

$$31 \rightarrow S\phi = C\theta_2(-S\phi_1) + S\phi_2 C\phi_2 (C\phi_1 S\psi_1) = S\phi_2 C\phi_1 C\psi_1 \tag{73}$$

$$32 \rightarrow C\phi S\psi = -S\phi_1(C\theta_2 S\phi_2 S\psi_2 - S\theta_2 C\psi_2) + \tag{74}$$
$$C\phi_1 S\psi_1 (S\theta_2 S\phi_2 S\psi_2 + C\theta_2 C\psi_2) + C\psi_1 C\phi_1 C\phi_2 S\psi_2$$

$$33 \rightarrow C(C\psi = -S\phi_1(C\theta_2 S\phi_2 C\psi_2 + S\phi_2 S\psi_2) + \tag{75}$$
$$C\phi_1 S\psi_1 (S\theta_2 S\phi_2 C\psi_2 - C\phi_2 S\psi_2) + C\phi_1 C\psi_1 C\phi_2 C\psi_2$$

$$22 \rightarrow S\theta S\phi S\psi + C\theta C\psi = S\phi_1 C\phi_1 (C\theta_2 S\phi_2 S \psi_2 - \tag{76}$$
$$(S\theta_2 C\psi_2) (S\theta_1 S\phi_1 S\psi_1 + C\theta_1 C\psi_1) (S\theta_2 S\phi_2 S\psi_2 +$$
$$C\theta_2 C\phi_2)C\phi_2 S\psi_2 (S\theta_1 S\phi_1 C\psi_1 - C\phi_1 S\psi_1)$$

$$23 \rightarrow S\theta S\phi C\psi - C\phi S\psi = S\phi_1 C\phi_1 (C\theta_2 S\phi_2 C\psi_2 + \tag{77}$$
$$S\phi_2 S\psi_2) + (S\theta_2 S\phi_1 S\psi_1 + C\theta_1 C\phi_1)(S\theta_2 S\phi_2 C\psi_2 -$$
$$C\phi_2 S\psi_2) + C\phi_2 C\psi_2 (S\theta_1 S\phi_1 C\psi_1 - C\phi_1 S\psi_1).$$

In addition to the above equations, the following equations are also true:

$$l_1^2 = [(\sqrt{3}/6)a_1 C\theta_1 - (1/2)a_1(C\theta_1 S\phi_1 S\psi_1 - S\theta_1 C\phi_1) + \tag{78}$$
$$r_{1x} - (\sqrt{3}/6)a_0]^2 + [(\sqrt{3}/6)a_1 S\phi_1 C\phi_1 - (1/2)a_1(S\theta_1 S\phi_1 S\psi_1 +$$
$$C\theta_1 C\psi_1) + r_{1y} + (a_0/2)]^2 + [-(\sqrt{3}/6)a_1 S\phi_1 -$$
$$(1/2) a_1 C\phi_1 S\psi_1 + r_{1z}]]^2$$

$$l_2^2 = [-(\sqrt{3}/12)a_1 C\theta_1 + (1/4)a_1(C\theta_1 S\phi_1 S\psi_1 - S\theta_1 C\phi_1) + \tag{79}$$
$$r_{1x} - (\sqrt{3}/6)a_0]^2 + [-(\sqrt{3}/12)a_1 S\phi_1 + (1/4)a_1(S\theta_1 S\phi_1 S\psi_1 +$$
$$C\theta_1 C\psi_1) + r_{1y} + (a_0/2)]^2 + [+(\sqrt{3}/12)a_1 S\phi_1 +$$
$$(1/4) a_1 C\phi_1 S\psi_1 + r_{1z}]^2$$

$$l_3^2 = [-(\sqrt{3}/3)a_1 C\theta_1 + r_{1x} + (\sqrt{3}/3)a_0]^2 + \tag{80}$$
$$[-(\sqrt{3}/3)a_1 S\phi_1 C\phi_1 + r_{1y}]^2 + [+(\sqrt{3}/3)a_1 S\phi_1 + r_{1z}]^2$$

$$l_4^2 = [(\sqrt{3}/6)a_1C\theta_1 + r_{1x} + (\sqrt{3}/3)a_0]^2 + \quad (81)$$
$$[(\sqrt{3}/6)a_1S\phi_1C\phi_1 + r_{1y}]^2 + [-(\sqrt{3}/6)a_1S\phi_1 + r_{1z}]^2$$

$$l_5^2 = [(\sqrt{3}/6)a_1C\theta_1 + (1/2)a_1(C\theta_1S\phi_1S\psi_1 - S\theta_1C\phi_1) + \quad (82)$$
$$r_{1x} - (\sqrt{3}/6)a_0]^2 + [+(\sqrt{3}/6)a_1S\phi_1C\phi_1 +$$
$$(1/2)a_1(S\theta_1S\phi_1S\psi_1 + C\theta_1C\psi_1) + r_{1y} - (1/2)a_0]^2 +$$
$$[-(\sqrt{3}/6)a_1S\phi_1 + (1/2)\,a_1C\phi_1S\psi_1 + r_{1z}]^2$$

$$l_6^2 = [-(\sqrt{3}/12)a_1C\theta_1 - (1/4)a_1(C\theta_1\phi_1S\psi_1 - S\theta_1C\psi_1) + \quad (83)$$
$$r_{1x} - (\sqrt{3}/6)a_0]^2 + [-(\sqrt{13}/12)a_1S\phi_1C\phi_1 -$$
$$(1/4)a_1(S\theta_1S\phi_1S\psi_1 + C\theta_1C\psi_1) + r_{1y} - (1/2)a_0]^2 +$$
$$[(\sqrt{3}/12)a_1S\phi_1 - (1/4)a_1C\phi_1S\psi_1 + r_{1z}]^2 - (1/2)a_2C\phi_2S\psi_2 +$$
$$r_y - (\sqrt{3}/6)a_1S\phi_1C\phi_1 - (1/2)a_1(S\theta_1S\phi_1S\psi_1 + C\theta_1C\psi_1) - r_{1y}]^2$$

$$l_7^2 = [(\sqrt{3}/6)a_2C\theta_2 - (1/2)a_2(C\theta_2\phi_2S\psi_2 - S\theta_2C\psi_2) + \quad (84)$$
$$r_x - (\sqrt{3}/6)a_1C\theta_1 - (1/2)a_1(C\theta_1S\phi_1S\psi_1 - S\theta_1C\psi_1) - r_{1x}]^2 +$$
$$[(\sqrt{3}/6)\,a_2S\phi_2C\phi_2 - (1/2)\,a_2C\phi_2S\psi_2 + r_y -$$
$$(\sqrt{3}/6)a_1S\phi_1C\phi_1 - (1/2)a_1(S\theta_1S\phi_1S\psi_1 + C\theta_1C\psi_1) -$$
$$R_{1y}]^2 + [-(\sqrt{3}/6)a_2S\phi_2 - (1/2)a_2(S\theta_2S\phi_2S\psi_2 +$$
$$C\theta_2C\psi_2) + r_z + (\sqrt{3}/6)a_1S\phi_1 - (1/2)a_1C_1S\psi_1 - r_{1z}]^2$$

$$l_8^2 = [(\sqrt{3}/6)C\theta_2 + (1/2)a_2(C\theta_2\phi_2S\psi_2 - S\theta_2C\psi_2) + \quad (85)$$
$$r_x + (\sqrt{3}/12)a_1C\theta_1 + (1/4)a_1(C\theta_1S\phi_1S\psi_1 - S\theta_1C\psi_1) - r_{1x}]^2 +$$
$$[(\sqrt{3}/6)\,a_2S\phi_2C\phi_2 + (1/2)\,a_2C\phi_2S\psi_2 + r_y +$$
$$(\sqrt{3}/12)a_1S\phi_1C\phi_1 + (1/4)a_1(S\theta_1S\phi_1S\psi_1 + C\theta_1C\psi_1) -$$
$$r_{1y}]^2 + [-(\sqrt{3}/6)a_2S\phi_2 - (1/2)a_2(S\theta_2S\phi_2S\psi_2 +$$
$$C\theta_2C\psi_2) + r_z - (\sqrt{3}/12)a_1S\phi_1 + (1/4)a_1C\phi_1S\psi_1 - r_{1z}]^2$$

$$l_9^2 = [(\sqrt{3}/6)a_2C\theta_2 - (1/2)a_2(C\theta_2\phi_2S\psi_2 - S\theta_2C\psi_2) + \quad (86)$$
$$r_x - (\sqrt{3}/6)a_1C\theta_1 + (1/2)a_1(C\theta_1S\phi_1S\psi_1 - S\theta_1C\psi_1) - r_{1x}]^2 +$$
$$[(\sqrt{3}/6)\,a_2S\phi_2C\phi_2 - (1/2)\,a_2C\phi_2S\psi_2 + r_y -$$
$$(\sqrt{3}/6)a_1S\phi_1C\phi_1 - (1/2)a_1(S\theta_1S\phi_1S\psi_1 + C\theta_1C\psi_1) -$$

$$r_{1y}]^2 + [-(\sqrt{3}/6)a_2S\phi_2 - (1/2)a_2(S\theta_2S\phi_2S\psi_2 +$$
$$C\theta_2C\psi_2) + r_z + (\sqrt{3}/6)a_1S\phi_1 + (1/2)a_1C\phi_1S\psi_1 - r_{1z}]^2$$

$$l_{10}^2 = [(\sqrt{3}/6)a_2C\theta_2 - (1/2)a_2(C\theta_2\phi_2S\psi_2 - S\theta_2C\psi_2) + \quad (84)$$
$$r_x + (\sqrt{3}/12)a_1C\theta_1 - (1/4)a_1(C\theta_1S\phi_1S\psi_1 - S\theta_1C\psi_1) - r_{1x}]^2 +$$
$$[(\sqrt{3}/6)\,a_2S\phi_2C\phi_2 - (1/2)\,a_2C\phi_2S\psi_2 + r_y +$$
$$(\sqrt{3}/12)a_1S\phi_1C\phi_1 - (1/4)a_1(S\theta_1S\phi_1S\psi_1 + C\theta_1C\psi_1) -$$
$$r_{1y}]^2 + [-(\sqrt{3}/6)a_2S\phi_2 - (1/2)a_2(S\theta_2S\phi_2S\psi_2 +$$
$$C\theta_2C\psi_2) + r_z - (\sqrt{3}/12)a_1S\phi_1 - (1/4)a_1C\theta_1S\psi_1 - r_{1z}]^2$$

$$l_{11}^2 = [-(\sqrt{3}/3)a_2C\theta_2 + r_x + (\sqrt{3}/3)a_1C\theta_1 - r_{1x}]^2 + \quad (88)$$
$$[(\sqrt{3}/3)a_2S\phi_2C\phi_2 + r_y + (\sqrt{3}/3)a_1S\phi_1C\phi_1 - r_{1y}]^2 +$$
$$[+(\sqrt{3}/3)a_2S\phi_2 + r_z - (\sqrt{3}/3)a_1S\phi_1 - r_{1z}]^2$$

$$l_{12}^2 = [-(\sqrt{3}/3)a_2C\theta_2 + r_x - (\sqrt{3}/6)a_1C\theta_1 - r_{1x}]^2 + \quad (89)$$
$$[-(\sqrt{3}/3)a_2S\phi_2C\phi_2 + r_y - (\sqrt{3}/6)a_1S\phi_1C\phi_1 - r_{1y}]^2 +$$
$$[+(\sqrt{3}/3)a_2S\phi_2 + r_z (\sqrt{3}/6)a_1S\phi_1 - r_{1z}]^2$$

The above equations (79)–(91) are the equations utilized by the computer to implement the inverse kinematics for the embodiments shown in FIGS. 10 and 11. Thus, given a desired location and orientation of the robotic fixture, the required actuation lengths $l_1$, $l_3$, $l_5$, $l_8$, $l_{10}$, and $l_{12}$ can be determined from the above equations. These actuation lengths are then provided under computer control.

As can be appreciated by those skilled in the art, the robotic structure of the invention is useful as a robotic arm, from small workspace applications, such as a small or miniaturized three-dimensional joint (e.g., a universal or ball-and-socket joint), to large workspace applications, such as an automated or manually operated crane for construction purposes. The robotic structure of the invention is not limited to the structures shown in the drawings, but can have two or more platforms; other configurations (e.g., square, rectangular, or circular) rather than triangular configurations, various triangular configurations (e.g., equilateral, isosceles, or scalene); one or more wires per intersecting "bundle;" various types of connectors; various types of actuators; and may be connectable to various types of robotic fixtures.

The invention has been described in detail with particular reference to a preferred embodiment thereof, but is will be understood that variations and modifications can be effected within the scope of the invention.

What is claimed is:

1. A low mass robotic arm comprising:
a base platform;

an effector platform;

means for supportively spacing and connecting said base platform and said effector platform, said means for supportively spacing and connecting said base platform and said effector platform comprising interwoven movable joint means intermediate said base platform and said effector platform;

linear actuator means operatively connecting said base platform and said effector platform; and means for selectively actuating each of said linear actuator means to operate said robotic arm.

2. The invention of claim 1 wherein said platform spacing and connecting means further comprises multiple longitudinal member means.

3. The invention of claim 2 wherein said multiple longitudinal member means comprises a plurality of bundles of longitudinal members.

4. The invention of claim 3 wherein said plurality of bundles is an odd plurality.

5. The invention of claim 3 wherein each of said bundles comprises an odd plurality of longitudinal members.

6. The invention of claim 3 wherein said at least one of said bundles further comprises movably engageable means for adjusting the resistance to movement of said interwoven movable joint means.

7. The invention of claim 1 wherein said platforms are in a triangular configuration.

8. The invention of claim 1 wherein said effector platform is adapted to engage at least one device selected from the group consisting of a robotic hand, and end effector, a gripper, and a robotics fixture.

9. The invention of claim 1 wherein said actuator means comprises at least one drive means selected from the group consisting of hydraulic, pneumatic, mechanical, magnetic, and electrical drive means.

10. A low mass robotic arm having at least seven degrees of freedom, capable of moving substantially throughout a hemispherical work space comprising:

a base platform;

at least one joint platform;

an effector platform;

means for supportively spacing and connecting said base platform and at least one said joint platform, said means for supportively spacing and connecting said base platform and at least one said joint platform comprising first interwoven movable joint means intermediate said base platform and at least one said joint platform;

first linear actuator means operatively connecting said base platform and at least one said joint platform;

means for supportively spacing and connecting at least one said joint platform and said effector platform, said means for supportively spacing and connecting at least one said joint platform and said effector platform comprising second interwoven movable joint means intermediate at least one said joint platform and said effector platform;

second linear actuator means operatively connecting at least one said joint platform and said effector platform; and means for selectively actuating each of said linear actuator means to operate said robotic arm.

11. The invention of claim 10 wherein at least one of said platform spacing and connecting means further comprises multiple longitudinal member means.

12. The invention of claim 11 wherein said multiple longitudinal member means comprises a plurality of bundles of longitudinal members.

13. The invention of claim 12 wherein said plurality of bundles is an odd plurality.

14. The invention of claim 12 wherein each of said bundles comprises an odd plurality of longitudinal members.

15. The invention of claim 12 wherein at least one of said bundles further comprises movably engageable means for adjusting the resistance to movement of said interwoven movable joint means.

16. The invention of claim 10 wherein at least one of said interwoven movable joint means comprises additional means for adjusting resistance to movement within said interwoven movable joint means.

17. The invention of claim 10 wherein at least one of said platforms connects with one of said spacing and connecting means in a triangular configuration.

18. The invention of claim 17 wherein said triangular configuration comprises an equilateral triangular configuration.

19. The invention of claim 10 wherein at least one of said platforms connects with one of said actuator means in a triangular configuration.

20. The invention of claim 19 wherein said triangular configuration comprises an equilateral triangular configuration.

21. The invention of claim 10 wherein said effector platform is adapted to engage at least one device selected from the group consisting of a robotic hand, an end effector, a gripper, and a robotics fixture.

22. The invention of claim 10 wherein said actuator means comprises at least one drive means selected from the group consisting of hydraulic, pneumatic, mechanical, magnetic, and electrical drive means.

23. The invention of claim 10 comprising two or more joint platforms, the robotic arm further comprising:

means for supportively spacing and connecting said joint platforms further comprising additional interwoven movable joint means;

additional linear actuator means operatively connecting said joint platforms; and means for selectively actuating each of said additional linear actuator means to operate said robotic arm.

* * * * *